(12) United States Patent
Mueller et al.

(10) Patent No.: US 11,182,127 B2
(45) Date of Patent: Nov. 23, 2021

(54) BINARY FLOATING-POINT MULTIPLY AND SCALE OPERATION FOR COMPUTE-INTENSIVE NUMERICAL APPLICATIONS AND APPARATUSES

(71) Applicant: International Business Machines Corporation, Armonk, NY (US)

(72) Inventors: Silvia Melitta Mueller, Altdorf (DE); Bruce Fleischer, Bedford Hills, NY (US); Ankur Agrawal, White Plains, NY (US); Kailash Gopalakrishnan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 231 days.

(21) Appl. No.: 16/363,611

(22) Filed: Mar. 25, 2019

(65) Prior Publication Data

US 2020/0310755 A1 Oct. 1, 2020

(51) Int. Cl.
*G06F 7/487* (2006.01)
*G06F 5/01* (2006.01)

(52) U.S. Cl.
CPC ............ *G06F 7/4876* (2013.01); *G06F 5/012* (2013.01)

(58) Field of Classification Search
CPC .................................. G06F 7/4876; G06F 5/012
See application file for complete search history.

(56) References Cited

U.S. PATENT DOCUMENTS

| | | |
|---|---|---|
| 4,969,118 A | 11/1990 | Montoye et al. |
| 5,880,984 A | 3/1999 | Burchfiel et al. |
| 6,044,454 A | 3/2000 | Schwarz et al. |
| 7,461,117 B2 | 12/2008 | Trong et al. |
| 8,429,217 B2 | 4/2013 | Schmookler |
| 8,694,572 B2 | 4/2014 | Samy et al. |
| 9,430,190 B2 | 8/2016 | Dao Trong et al. |
| 9,778,909 B2 | 10/2017 | Samudrala et al. |
| 9,841,948 B2 * | 12/2017 | Wang ...................... G06F 7/483 |

(Continued)

OTHER PUBLICATIONS

Boersma, Maarten, et al. "The POWER7 Binary Floating-Point Unit." 20th IEEE Symposium on Computer Arithmetic, 2011. 6 pages.

(Continued)

*Primary Examiner* — Michael D. Yaary
(74) *Attorney, Agent, or Firm* — Amin, Turocy & Watson, LLP

(57) ABSTRACT

Techniques facilitating binary floating-point multiply and scale operation for compute-intensive numerical applications and apparatuses are provided. An embodiment relates to a system that can comprise a memory that stores computer executable components and a processor that executes the computer executable components stored in the memory. The computer executable components can comprise a receiver component that receives an instruction to perform a multiply and scale operation of the first floating point operand value, the second floating point operand value, and the integer operand value, wherein the multiplication component obtains the floating-point product in response to the instruction to perform the multiply and scale operation. The multiplication can be performed as a single instruction.

17 Claims, 11 Drawing Sheets

(56) References Cited

U.S. PATENT DOCUMENTS

| | | | |
|---|---|---|---|
| 10,402,168 B2 * | 9/2019 | Hasenplaugh | G06F 1/3237 |
| 2005/0228844 A1 | 10/2005 | Dhong et al. | |
| 2017/0220343 A1 * | 8/2017 | Bradbury | G06F 7/4876 |
| 2019/0018648 A1 * | 1/2019 | Kroener | G06F 7/5443 |

OTHER PUBLICATIONS

Mueller, Silvia M., et al. "Computer Architecture: complexity and correctness", Springer, Berlin. (2000). 560 pages.

\* cited by examiner

BINARY FLOATING-POINT MULTIPLY AND SCALE OPERATION FOR COMPUTE-INTENSIVE NUMERICAL APPLICATIONS AND APPARATUSES

BACKGROUND

The subject disclosure relates to binary floating-point multiply and scale operations for compute-intensive numerical applications and apparatuses.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, apparatuses, and/or computer program products that can facilitate binary floating-point multiply and scale operations for compute-intensive numerical applications are provided.

According to an embodiment, provided is a computer-implemented method that can comprise obtaining, by a system operatively coupled to a processor, a result. The result can be a result of a compute-intensive numerical application based on implementation of a single instruction for a binary floating-point multiply and scale operation.

Another embodiment relates to a system that can comprise a memory that stores computer executable components and a processor that executes the computer executable components stored in the memory. The computer executable components can comprise a receiver component that receives an instruction to perform a multiply and scale operation of the first floating point operand value, the second floating point operand value, and the integer operand value, wherein the multiplication component obtains the floating-point product in response to the instruction to perform the multiply and scale operation. The multiplication can be performed as a single instruction.

Yet another embodiment relates to computer program product that facilitates binary floating point multiply and scale operation processing within a computing environment, the computer program product comprising a computer readable storage medium having program instructions embodied therewith, the program instructions are executable by a processor. The program instructions can cause the processor to obtain a result comprising a floating-point product based on a multiplication of a first floating-point operand value with a second floating point operand value and two to the power of an integer operand value, wherein the multiplication is performed as a single instruction.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The disclosed aspects facilitate binary floating-point multiply and scale operations for compute-intensive numerical applications for various systems, devices, computer-implemented methods, apparatuses, and/or computer program products. A non-limiting example of a compute-intensive numerical application can be a deep-learning application.

Figure 1:
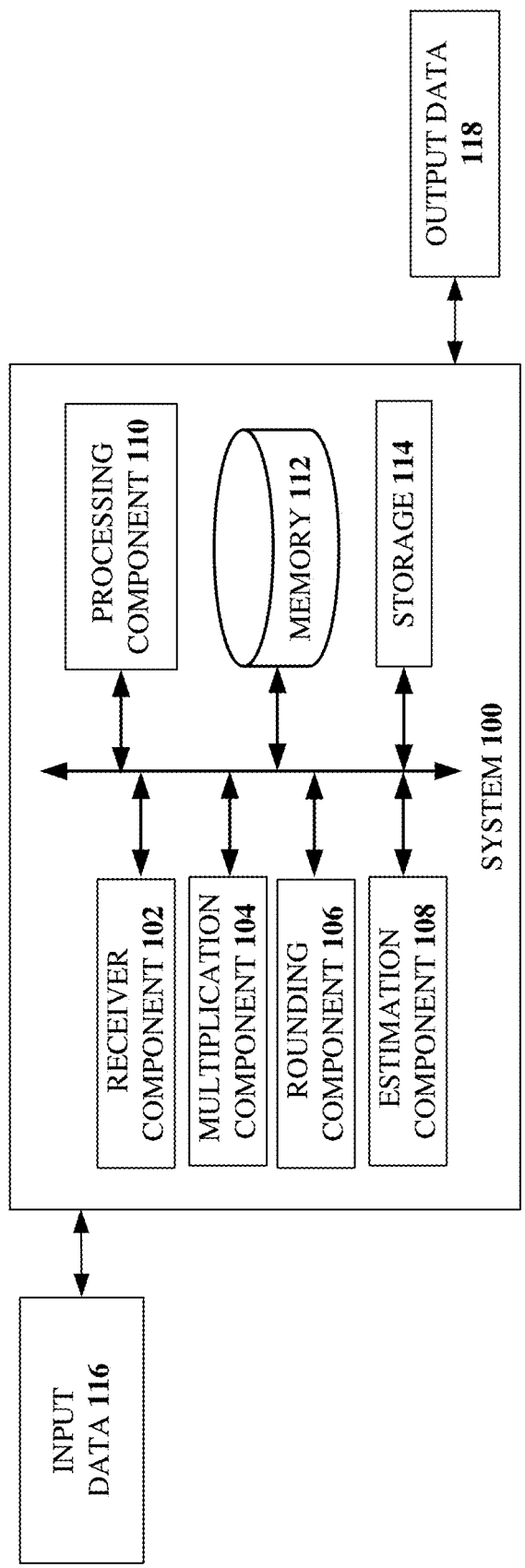
FIG. 1 illustrates an example, non-limiting, system that facilitates a binary floating-point multiply and scale operation for compute-intensive numerical applications in accordance with one or more embodiments described herein.

FIG. 1 illustrates an example, non-limiting, system 100 that facilitates a binary floating-point multiply and scale operation for compute-intensive numerical applications in accordance with one or more embodiments described herein. Aspects of systems (e.g., the system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

In various embodiments, the system 100 can be a floating-point unit system associated with technologies such as, but not limited to, floating point computation technologies, artificial intelligence technologies, and/or other digital technologies. The system 100 can employ hardware and/or software to solve problems that are highly technical in nature, that are not abstract and that cannot be performed as a set of mental acts by a human. Further, in certain embodiments, some of the processes performed can be performed by one or more specialized computers (e.g., one or more specialized processing units, a specialized computer with a floating-point unit component, etc.) to carry out defined tasks related to facilitating binary floating-point multiply and scale operations for compute-intensive numerical applications as discussed herein.

The system 100 and/or components of the system 100 can be employed to solve new problems that arise through advancements in technologies mentioned above, computer architecture, and/or the like. One or more embodiments of the system 100 can provide technical improvements to computing systems, circuit systems, processor systems, artificial intelligence systems, and/or other systems. One or more embodiments of the system 100 can also provide technical improvements to a processor by improving processing performance of the processor, improving processing efficiency of the processor, improving processing characteristics of the processor, and/or improving power efficiency of the processor.

In the embodiment shown in FIG. 1, the system 100 can comprise a receiver component 102, a multiplication component 104, a rounding component 106, an estimation component 108, a processing component 110, a memory 112, and/or a storage 114. The memory 112 can store computer executable components and instructions. The processing component 110 (e.g., a processor) can facilitate execution of the instructions (e.g., computer executable components and corresponding instructions) by the receiver component 102, the multiplication component 104, the rounding component 106, the estimation component 108, and/or other system components. As shown, in some embodiments, one or more of the receiver component 102, the multiplication component 104, the rounding component 106, the estimation component 108, the processing component 110, the memory 112, and/or the storage 114 can be electrically, communicatively, and/or operatively coupled to one another to perform one or more functions of the system 100.

The receiver component 102 can receive, as input data 116 one or more values. For example, the values can comprise a first floating-point operand value, a second floating point operand value, and an integer operand value. In an implementation, the input data 116 can comprise an instruction to perform a multiply and scale operation of the first floating point operand value, the second floating point operand value, and the integer operand value.

The multiplication component 104 can, in a single instruction, obtain a result that includes a floating-point product. For example, the result determined by the multiplication component 104 can be based on a multiplication of the first floating point operand value with a second floating point operand value and two to the power of an integer operand value. The result can be output as output data 118. Obtaining the floating-point product can reduce and/or mitigate an amount of processing overhead due to the single instruction.

According to some implementations, the integer operand value can be based on a source register address or an immediate field of the instruction. In an example, the integer operand value can define a scaling value that comprises a value of 1.0. In another example the integer operand value can define a value represented by two to the power of an integer operand value. In accordance with some implementations, the system 100 can compute a resulting exponent based on inclusion of an immediate value in a product exponent term.

In some implementations, the multiplication component 104 can obtain an intermediate scaled product and the rounding component 106 can round the intermediate scaled product to a floating-point format. For example, the computation by the rounding component 106 can be based on a defined rounding and corner case handling procedure. An example of a defined rounding and corner case handling procedure can be a rounding and corner case handling procedure as defined in the Institute of Electrical and Electronics Engineers (IEEE) standard. However, other rounding and corner case handling procedures can be utilized with the disclosed aspects.

According to some implementations, the system 100 can be implemented as a system that comprises a fused-multiply add unit to determine the result based on selection of an equation from a set of two equations. The selection of the equation can be based on a comparison between an addend and a product. In some implementations, the system 100 can be implemented as a system that comprises separate multiple and divide engines.

The system 100 (and other embodiments discussed herein) can apply to a multiply instruction, as opposed to a multiply-add instruction. Further, the system 100 (and other embodiments discussed herein) can be low overhead and can have less complexity, since it does not need to deal with denormals. In addition, the system 100 (and other embodiments discussed herein) only needs three operands (A, B, n), as opposed to four or more operands. For example, Reduced Instruction Set Computer (RISC) machines (e.g., power processors) can support a maximum of three operations. Further, more than three operations can also be difficult to support in Complex Instruction Set Computer (CISC) machines.

It is to be appreciated that the system 100 can obtain the result in a single instruction, which cannot be performed by a human (e.g., is greater than the capability of a single human mind). For example, an amount of data processed, a speed of data processed and/or data types of data processed by the system 100 over a certain period of time can be greater, faster, and different than an amount, speed, and data type that can be processed by a single human mind over the same period of time. The system 100 can also be fully operational towards performing one or more other functions (e.g., fully powered on, fully executed, etc.) while also performing the above-referenced binary floating point multiply and scale operations. Moreover, the data processed and/or generated and coordinated by the system 100 can include information that is impossible to obtain manually by a user. For example, a type of information included in the input data 116, a variety of information associated with the input data 116, and/or optimization of the input data 116 to generate and output the one or more results of the binary floating point multiply and scale operations (e.g., output data 118) can be more complex than information that can be obtained manually and processed by a user.

Figure 2:
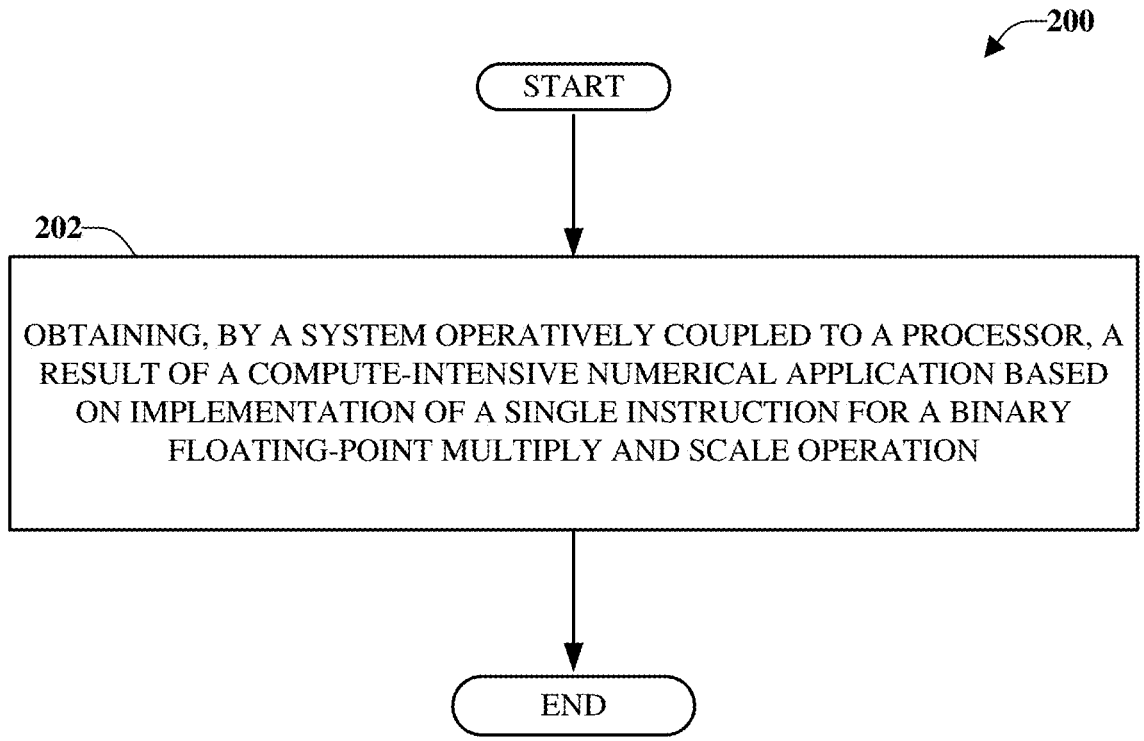
FIG. 2 illustrates a flow diagram of an example, non-limiting, computer-implemented method that facilitates binary floating point multiply and scale operations in accordance with one or more embodiments described herein.

FIG. 2 illustrates a flow diagram of an example, non-limiting, computer-implemented method 200 that facilitates binary floating point multiply and scale operations in accordance with one or more embodiments described herein. Repetitive description of like elements employed in other embodiments described herein is omitted for sake of brevity.

In some implementations, a system comprising a processor can perform the computer-implemented method 200 and/or other methods discussed herein. In other implementations, a device comprising a processor can perform the computer-implemented method 200 and/or other methods discussed herein. In other implementations, a machine-readable storage medium, can comprise executable instructions that, when executed by a processor, facilitate performance of operations, which can be the operations discussed with respect to the computer-implemented method 200 and/or other methods discussed herein. In further implementations, a computer readable storage device comprising executable instructions that, in response to execution, cause a system comprising a processor to perform operations, which can be operations discussed with respect to the computer-implemented method 200 and/or other methods discussed herein.

Deep learning applications are very compute intensive. With the wide spread use of machine/deep learning, there can be additional constraints such as having short response times for inference, being able to speedup training to allow the systems to adapt to a changing world, and performing these functions economically. Accordingly, special hardware acceleration even beyond Graphics Processing Units (GPUs) can be enhanced to significantly improve the performance (e.g., response time and throughput), the performance per wattage, and performance per chip area.

There are several application domains, for example, image classification, temporal sequences, Watson natural language classification, or speech phoneme classification. Depending on the domain, the training part spend 70-90% of the time in matrix-vector operations. However, there is also a part, such as pooling or calculating the activation functions which spend significant time in mathematical functions (e.g., divide, square root, logarithm, and exponent).

The mathematical functions can be implemented with software routines, using regular floating-point instructions plus some special assist instructions. An operation of these software routines is $A*B*2^i$ (multiply-scale), where A, B are floating-point values and i is a binary integer.

The various aspects discussed herein can perform the multiply-and-scale operation with as few instructions, as few computation cycles, and as little extra area as possible. For example, at 202 of the computer-implemented method 200, a system operatively coupled to one or more processors, can obtain a result of a compute-intensive numerical application on implementation of a single instruction for a binary floating-point multiply and scale operation for compute-intensive numerical applications. In an example, the compute-intensive numerical application can be a deep learning application.

According to an implementation, the result can comprise a floating-point product that is based on a multiplication of a first floating-point operand value with a second floating point operand value and two to the power of an integer operand value (e.g., via the multiplication component 204). The multiplication can be performed as a single instruction.

In an example, an instruction can be implemented, which can be a multiply and scale operation: $R=A*B*2^i$, where A, B are two floating-point operands, i is a binary integer (e.g. in 2's complement format) and the result R is again a floating-point number. As part of the operation, there can be the regular Not a Number (NaN) and Infinity handling and the standard overflow, underflow and invalid checks, according to some implementations. It is noted that the integer i can be either an immediate operand or a register operand.

The implementation of the Mul-Scale operation on a fused-multiply-add pipeline can be very low cost. For example, a traditional Fused Multiply Add (FMA) pipeline that computes $A*B+C$, generates among other values the exponent of the product in an internal format as:

$$ep = ea + eb + \text{constant}$$

where the constant is implementation specific (e.g.: -bias). This exponent then can be used in further computation steps of the exponent and rounding logic.

For the traditional Mul-Scale operation, the FMA data-path computes $A*B+0.0$, (e.g., the addend is forced to zero), and the product exponent is adjusted as:

$$ep = ea + eb + \text{constant} + i$$

The remainder of the exponent and mantissa calculation remain the same. However, the traditional Mul-Scale operation that implements the FMA pipeline and/or the FMA data-path uses a multiple instruction sequence, which uses multiple computation cycles. The various aspects discussed herein can perform the multiply-and-scale operation with a single instruction, which uses less computation cycles than the traditional Mul-Scale operation.

Advantages of the disclosed aspects include that, with the disclosed instructions, the task $A*B*2^i$ can be performed with a single instruction instead of a multi-instruction sequence. This can shorten the inner loop of critical deep learning routines, such as computation of square-root and exponent. Also, this can be a performance advantage, since the code requires fewer cycles. Shortening the instruction sequence can allow for potentially smaller instruction buffers, and also helps the performance/area.

Figure 3:
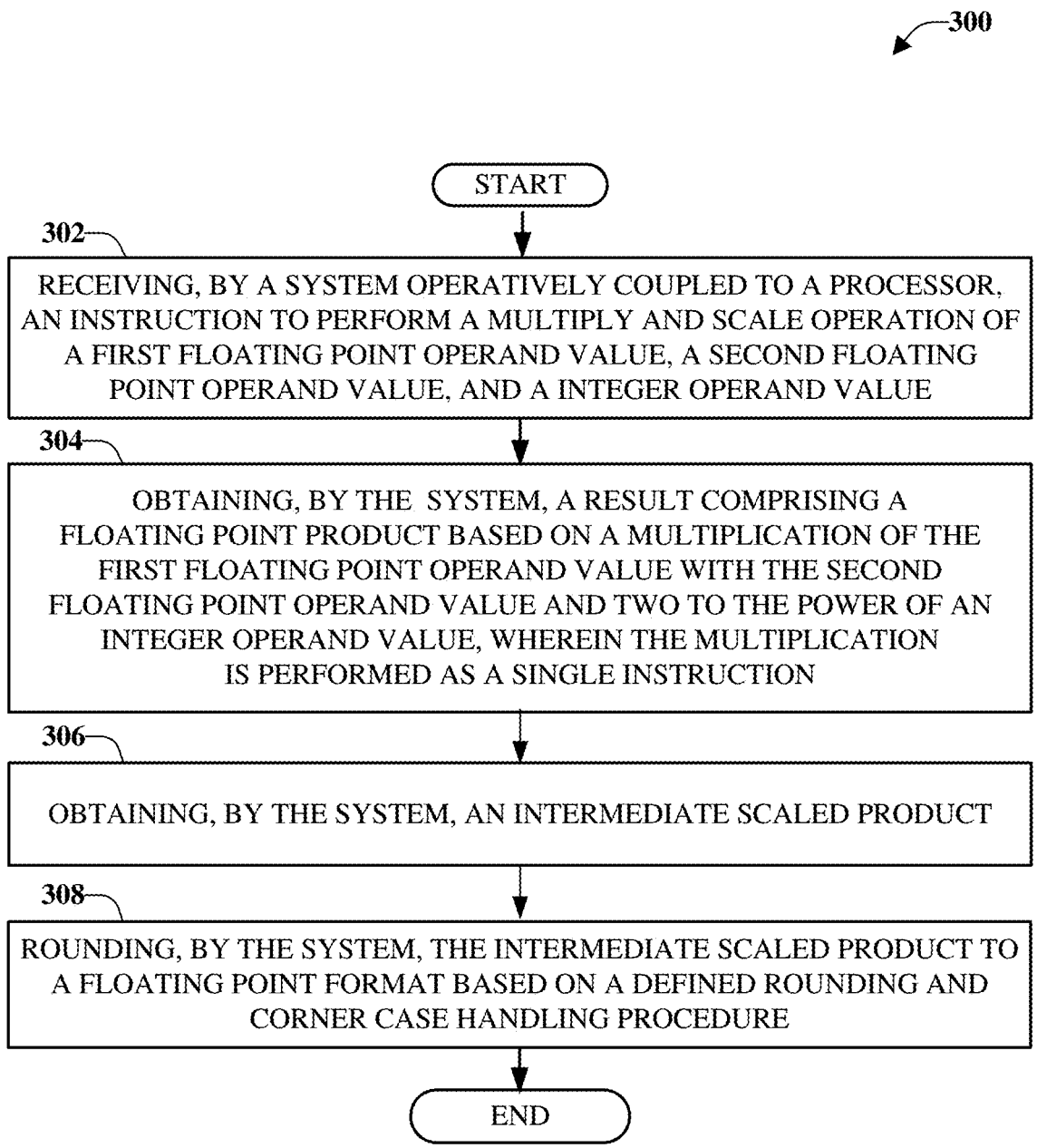
FIG. 3 illustrates a flow diagram of an example, non-limiting, computer-implemented method that facilitates a single instruction binary floating point multiple and scale operation in accordance with one or more embodiments described herein.

FIG. 3 illustrates a flow diagram of an example, non-limiting, computer-implemented method 300 that facilitates a single instruction binary floating point multiple and scale operation in accordance with one or more embodiments described herein. Repetitive description of like elements employed in other embodiments described herein is omitted for sake of brevity.

In some implementations, a system comprising a processor can perform the computer-implemented method 200, the computer-implemented method 300, and/or other methods discussed herein. In other implementations, a device comprising a processor can perform the computer-implemented method 200, the computer-implemented method 300, and/or other methods discussed herein. In other implementations, a machine-readable storage medium, can comprise executable instructions that, when executed by a processor, facilitate performance of operations, which can be the operations discussed with respect the computer-implemented method 200, the computer-implemented method 300, and/or other methods discussed herein. In further implementations, a computer readable storage device comprising executable instructions that, in response to execution, cause a system comprising a processor to perform operations, which can be operations discussed with respect to the computer-implemented method 200, the computer-implemented method 300, and/or other methods discussed herein.

At 302 of computer-implemented method 300, a system operatively coupled to one or more processors, can receive an instruction to perform a multiply and scale operation of a first floating-point operand value, a second floating point operand value, and an integer operand value (e.g., via the receiver component 302). Further, at 304 of the computer-implemented method 300, the system can obtain a result comprising a floating point product based on a multiplication of a first floating point operand value with a second floating point operand value and two to the power of an integer operand value (e.g., via the multiplication component 304). The multiplication can be performed as a single instruction. the integer operand value can be based on a source register address or an immediate field of the instruction. Further, the integer operand value can define a scaling value that comprises a value of 1.0 or a value represented by two to the power of an integer operand value.

The system can also, at 306 of the computer-implemented method 300, obtain an intermediate scaled product, which can be rounded, by the system, can round the intermediate scaled product to a floating-point format based on a defined rounding and corner case handling procedure, at 308 of the computer-implemented method 300 (e.g., via the rounding component).

In an example, the computer-implemented methods can be implemented by a system that comprises a multiply engine and a divide engine, wherein the divide engine is separate from the multiply engine. For example, obtaining the result can comprise obtaining the result based on an equation eq'=ea+eb+i−lza−lzb−bias, where ea is an exponent of input A, eb is an exponent of input B, lza is a number of leading zeros in a mantissa of A, lzb is the number of leading zeros in the mantissa of b, and i is an integer.

In another example, the computer-implemented methods can be implemented by fused-multiply add unit that determines the result based on selection of an equation from a set of two equations, wherein the selection of the equation is based on a comparison between an addend and a product. For example, obtaining the result can comprise using a first equation based on a first determination that an addend is less than a product or a second equation based on a second determination that the addend is not less than the product.

In further detail, time spent by deep learning applications in matrix computers (e.g., convolution, matrix-multiply, and so forth) can be in the range of about seventy percent to around ninety percent. Further, time spent by deep learning applications in other special functions (e.g., exponent, softmax, batch-norm, and so on) can be in the range of around ten percent to about thirty percent).

Further, many of these iterative routines cannot be computed in a single operation (or step). For example, a commonly encountered computation kernel can be: A times B times 2 to the power of i (A*B*2^i). This can be in multiple operations. For example, 2^i can be pre-computed, however, there are still two subsequent multiply operations (e.g., A*B and A*B*2^i). When performing deep learning, the amount of time spent in these loops should be reduced and/or mitigated as much as possible. Accordingly, the disclosed aspects can solve the equation in a single instruction.

An example approach can be that if the value 2^1 of an integer "i" is also available as floating-point value EI, then the operation can be performed with two multiples, namely, $P=A*B$ $R=P*EI$ Accordingly, the operation A*B could be performed and then the product of that operation (e.g., P) can be multiplied by EI (e.g., P*EI), where EI is a floating-point number.

In another example approach, if the value 2^i is not available, but the integer "i" is available as a floating-point value H, then a scale operation (e.g., FSCALE) can be used.

$P=A*B$ $R=fscale(FI,P)=P*2^{\text{(trunc-to-integer}(FI))}$

This is similar to determining two to the power of i (2^i) as a floating-point value and obtaining P and F1, where P and F1 are floating point values, and truncate the floating-point number an integer, and then to the power of 2. This is more complicated than the above operation because scaling takes longer than a normal multiply instruction.

In yet another example approach, if the integer is only available in binary integer format, one more instruction is required:

$P=A*B$ $F1=\text{int-2-float}(i)$ $R=fscale(FI,P)$

Thus, if integer i is obtained, it can be converted into a floating-point number and fscale can be used.

According to yet another example approach, bias can be added to an integer and exponent instructions can be used. Then the value can be multiplied by the two. The decimal floating-point architecture of z Systems can have an insert exponent instruction (IEDTR, IEXTR); it takes a decimal floating-point number and replaces its exponent by the biased integer given as input ib. With an equivalent of this instruction for binary floating-point, the multiply-scale could be obtained as follows:

$P=A*B$ $ib=i+\text{bias}$ $Ei=\text{insert\_exponent\_}bfp(1.0,ib)$ $R=P*Ei$

It is noted that ib is the biased representation of the desired scaling value i. The insert exponent could also be emulated by bit manipulations, shifting the integer ib to the appropriate position making-out the exponent field of 1.0 and ORing in the shifted ib at exponent position. That would require even more instructions.

The above approaches use multiple instructions to obtain the desired result. For example, an approach can use an equation such as P=(A*B+C)*2^1. In this case, there are four operands (A, B, C, and i) used. This can be difficult for a machine, especially for reduced instruction set computers, to perform. This is because it has to be specified in the instruction word that there are four operand sources and machines with large numbers of registers can quickly run out of 32-bit instructions and do not have enough room. This can also be difficult for machines that have processors that are out of order (e.g., very complicated sequencing internally). Accordingly, to obtain the best possible performance, while having a large number of operands, results in a wider structure, which can become costly. The one or more embodiments provided herein are lighter weight and simpler for a machine to implement.

Figure 4:
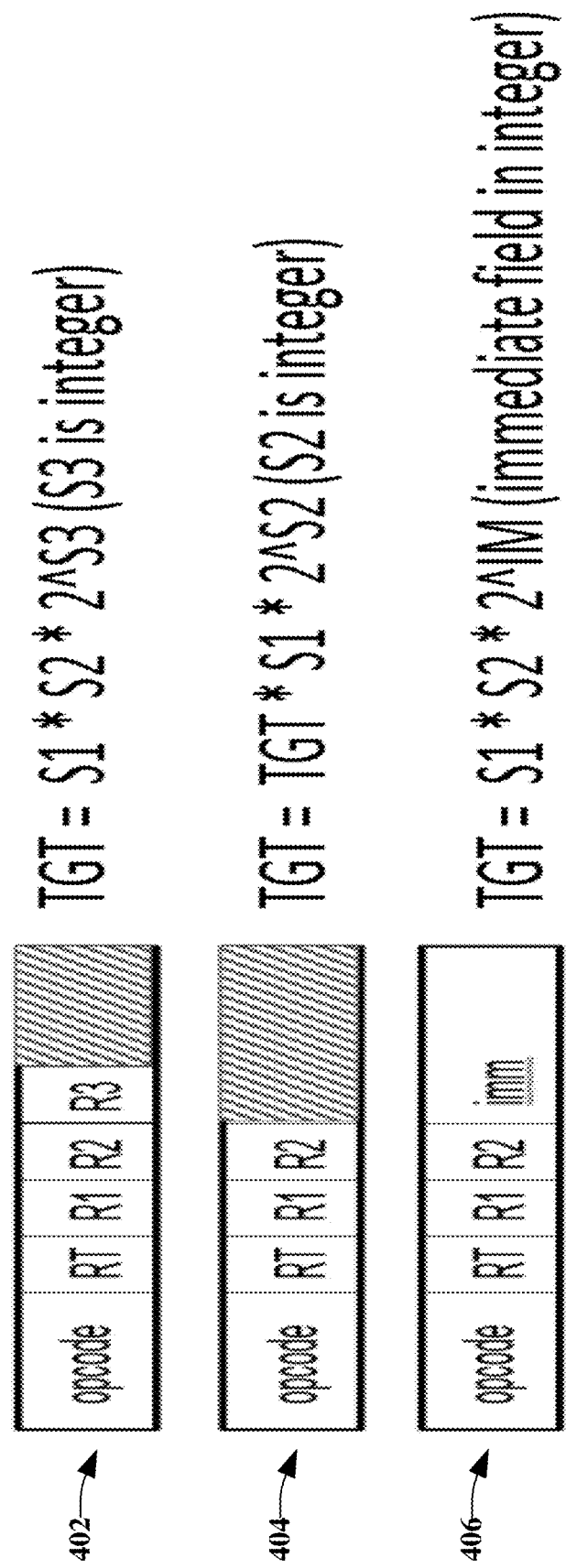
FIG. 4 illustrates example, non-limiting, instruction formats that can be implemented in accordance with one or more embodiments described herein.

FIG. 4 illustrates example, non-limiting, instruction formats that can be implemented in accordance with one or more embodiments described herein.

According to one or more implementations, an instruction can be:

$$R = A*B*2\hat{}i$$

where A, B are two floating-point operands, i is a binary integer (e.g. in 2's complement format) and the result R is again a floating-point number. As part of the operation, there is the regular NAN and infinity handling and the standard overflow, underflow and invalid checks.

A first instruction format for writing the instruction (R=A*B*2^i) is illustrated at 402. In this case, TGT=S1*S2*2^S3, where S3 is an integer. RT specifies a target destination TGT, which can be a register in a register file, or a memory location, or an output port. Further, R1, R2, R3 specify source operands S1, S2, S3, which can be a register in a register file, a memory location, or an input port. For example, R1 is a first register, R2 is a second register, and R3 is a third register. The values A, B, and i can be stored in the registers. For example, value A can be stored in R1, value B can be stored in R2, and value i can be stored in R3. However, the values can be stored in other registers (e.g., B can be stored in R1, A can be stored in R3, i can be stored in R2, and so on). Further, RT is the location where the value R can be written. In this first version (TGT=S1*S2*2^S3), the result, and the operands S1 and S2 are in binary floating-point format; the operand S3 is in signed binary integer format (e.g., 2s complement representation)

A second instruction format for writing the instruction (R=A*B*2^i) is illustrated at 404. In this case, TGT=TGT*S1*2^S2, where S2 is an integer. This variation has two fields, R1 and R2. For example, S1 can be the content of R1 and S2 can be the content of R2. It can be implicitly assumed that the target is being updated, where the target contains one of the sources. In this second version (TGT=TGT*S1*2^S2), the result, and the operands TGT and S1 are in binary floating-point format; the operand S2 is in signed binary integer format (e.g., 2s complement representation).

A third instruction format for writing the instruction (R=A*B*2^i) is illustrated at 406. In this case, TGT=S1*S2*2^IM, where IM is the immediate field and an integer. Further, imm is a specifier of an immediate operand IM; this can be taking the bits in the field imm and interpreting them as a binary integer, or it can be used as a pointer into a list of constants. For example, instead of pointing to a field where the value is located, and needing to go and find a value, in this embodiment, the value is being provided. Thus, instead of S3, there is the immediate value itself. In this third version (TGT=S1*S2*2^IM), the result, and the operands S1 and S2 are in binary floating-point format; the operand IM is in signed binary integer format (e.g., 2s complement representation).

In all three forms above, the two floating-point operands are multiplied, and the product is then scaled by the integer operand (e.g., the product is multiplied by the power of 2 of the integer operand K (2^K). The scaled product is then stored at the TGT location. (Depending on the format, K is either S3, S2 or IM).

When both floating-point operands are finite numbers, they can be multiplied forming an intermediate product (which is not rounded), and the integer raised to the power of 2 gets multiplied to product forming an intermediate scaled product. The intermediate scaled product, if nonzero, gets rounded to the target floating-point format using a specified rounding mode. Exponent and fraction of the intermediate product are maintained exactly; rounding and range checking occurs only on the intermediate scaled product.

The handling of special operands (e.g., NaN, infinity, and zero), for the multiply and scale is the same as that for a multiply operation. Both instructions also have the same kind of range checking, with the only difference that the multiply performs the checking on the intermediate product and the multiply and scale does it on the scaled intermediate product. The exact definition of special case handling and checking depends on the underlying floating-point specification. This can be the IEEE-754-2008 standard or the special floating-point specification optimized for deep-learning.

The multiply-scale instructions discussed herein can be supported in various different types of binary floating-point units (FPU). For example, a floating-point unit that can implement the disclosed aspects can be a fused multiply-add type FPU. In another example, a floating-point unit that can implement the disclosed aspects can be an FPU with separate multiply and add engines. However, other types of floating-point units can implement the various aspects discussed herein.

Figure 5:
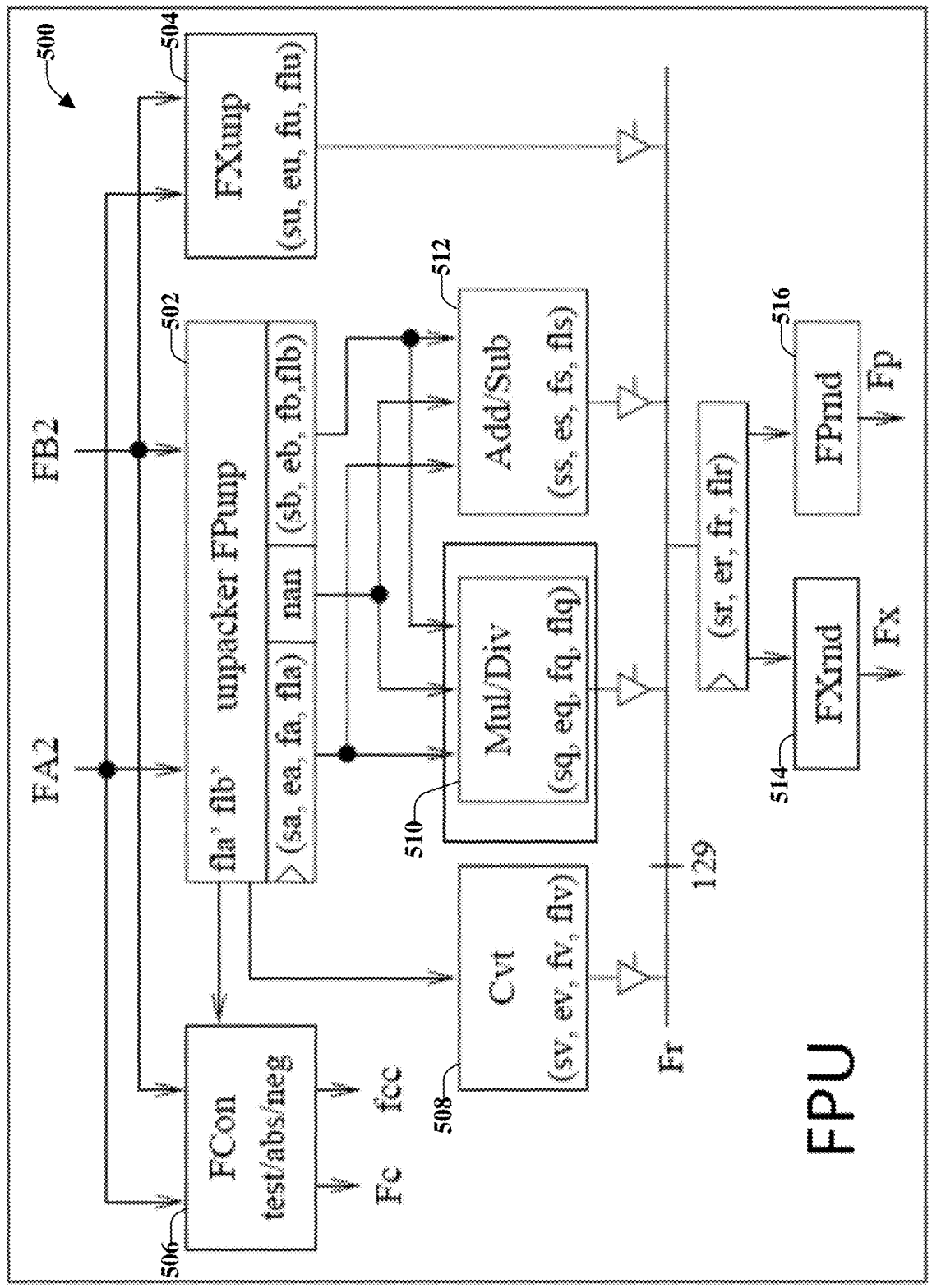
FIG. 5 illustrates an example, non-limiting, top level schematic of a floating-point unit that can be configured to execute the binary floating-point multiply and scale operations for compute-intensive numerical applications in accordance with one or more embodiments described herein.

FIG. 5 illustrates an example, non-limiting, top level schematic of a floating-point unit (FPU 500) that can be configured to execute the binary floating-point multiply and scale operations for compute-intensive numerical applications in accordance with one or more embodiments described herein. The FPU 500 is an example of a non-limiting hardware configuration that can be configured to execute the software instruction discussed with respect to FIG. 4. For example, the FPU 500 can be an FPU with separate multiply and add engines.

Figure 6:
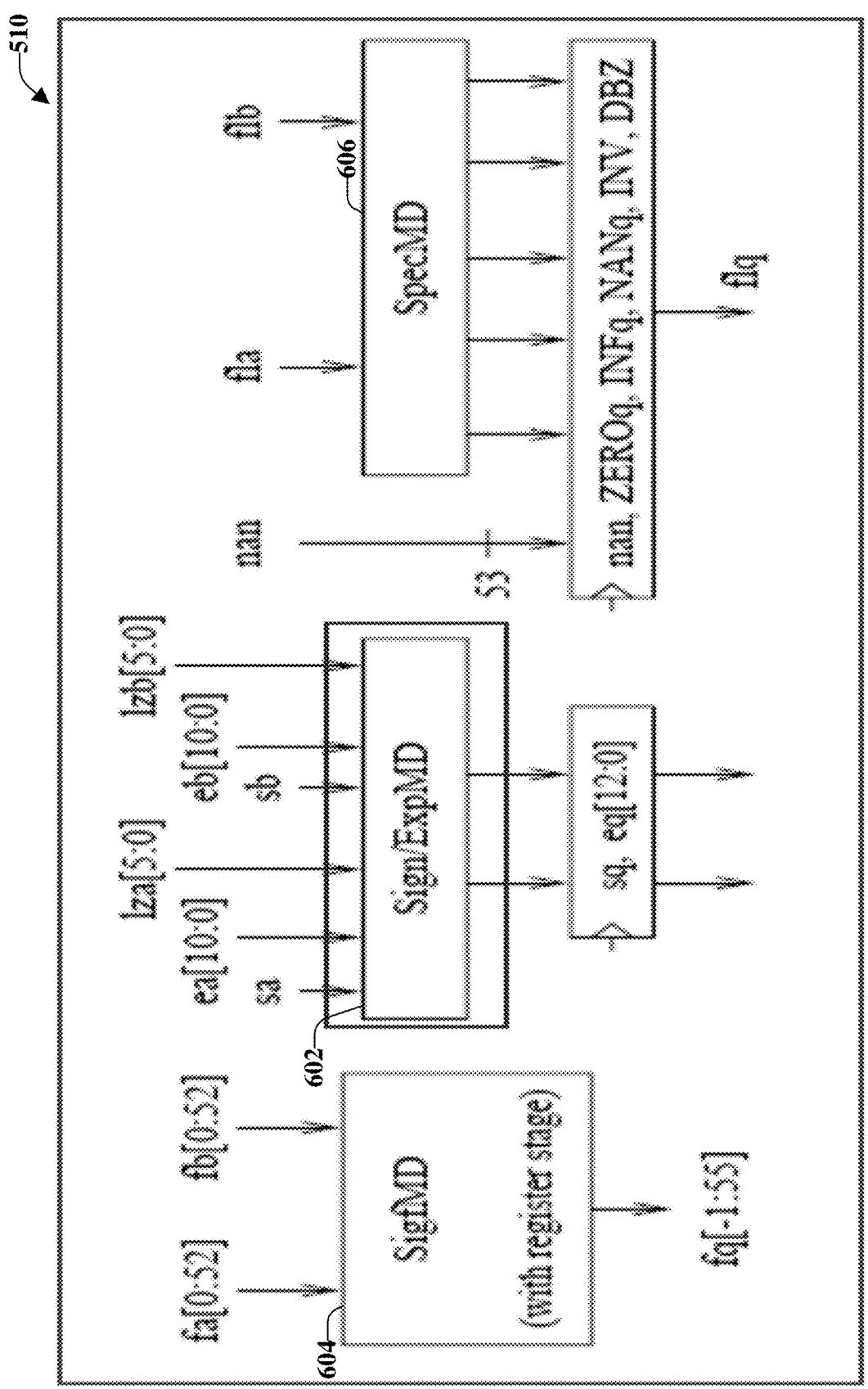
FIG. 6 illustrates an example, non-limiting, multiply and/or divider engine in accordance with one or more embodiments described herein.
Figure 7:
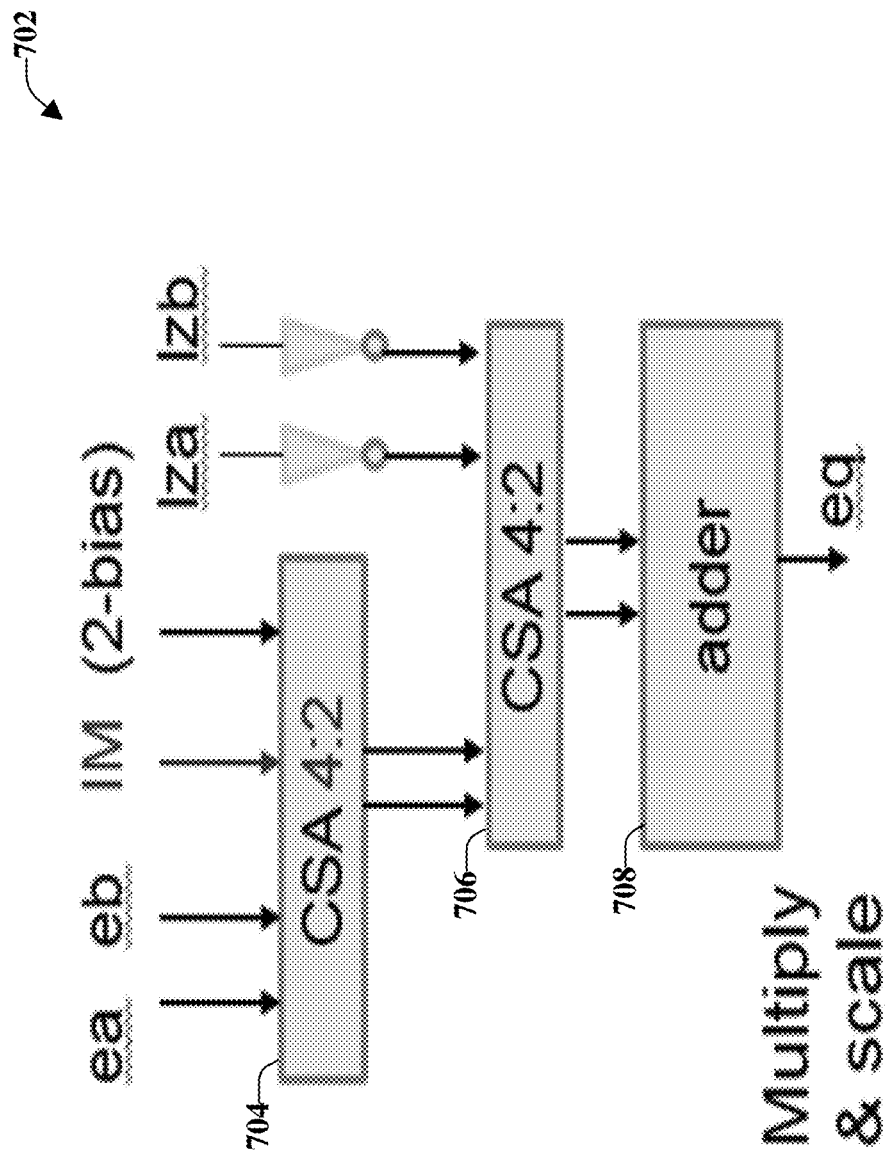
FIG. 7 illustrates an exploded view of sign exponent logic of FIG. 6 in accordance with one or more embodiments described herein.

As illustrated, the FPU 500 can receive as inputs FA2 and input FB2. The FPU 500 can comprise a floating-point unpacker FPunp 502, a fixed-point unpacker FXunp 504, a floating-point condition test circuit FCon 506, a circuit CVT 508, a multiplier/divider engine 510, an adder/subtractor 512, a fixed-point rounder FXrnd 514, and a floating-point rounder FPrnd 516. The multiplier/divider engine 510 can be configured to execute the software instruction discussed with respect to FIG. 4. For example, FIG. 6 illustrates an example, non-limiting, multiply and/or divider engine (e.g., the multiplier/divider engine 510) in accordance with one or more embodiments described herein. Repetitive description of like elements employed in other embodiments described herein is omitted for sake of brevity. The multiplier/divider engine 510 comprises a sign exponent logic 602 (e.g., a significant multiply/divide circuit), a sign and exponent circuit Sign/ExpMD 604, and a circuit SpecMD 606. Further, FIG. 7 illustrates an exploded view of sign exponent logic 602 of FIG. 6 in accordance with one or more embodiments described herein.

The instruction provided herein can be easily implemented on a floating-point (FP) unit with fused-multiply-add data flow but also on a FP multiply unit. An example implementation of a FP multiply-unit can be configured such that the mantissa handling of the multiply-and-scale is exactly the same as that of a regular multiply operation. The only difference is in the exponent calculation. For example, the exponent of the exact intermediate product can be obtained as:

$$eq = ea - lza + (eb - lzb) - \text{bias}$$

where ea and eb are the exponents of the two floating-point operands; lza and lzb are the number of leading zeros in the mantissa of the first and second operand, if that operand is a subnormal number.

Scaling the product with 2^K is obtained by adding K to the above equation:

$$eq' = eq + K = ea - lza + (eb - lzb) - \text{bias} + K$$

According to various implementations, the equation of exponent for the product prior to rounding can be:

$$eq' = ea + eb + i - lza - lzb - \text{bias}$$

where ea and eb are exponents of A, B. Further, lza and lzb are the number of leading zeros in the mantissa of A and B, if any of the numbers is subnormal. In addition, i is an integer. The sign exponent logic 602 can implement the above equation for eq'.

As illustrated, for multiply and scale 702, a first carry save adder block (first CSA block 704) can receive as input ea and eb. The first CSA block 704 can be configured to compress four data to two data (4:2). Further, a second CSA block 706 can receive as input lza and lzb. The second CSA block 706 can be configured to compress four data to two data (4:2). Further, an adder 708 can determine the value of eq. As can be determined from FIGS. 4-7, the various aspects discussed herein can have low overhead since this is not a critical path in an FPU (e.g., the FPU 500).

Figure 8:
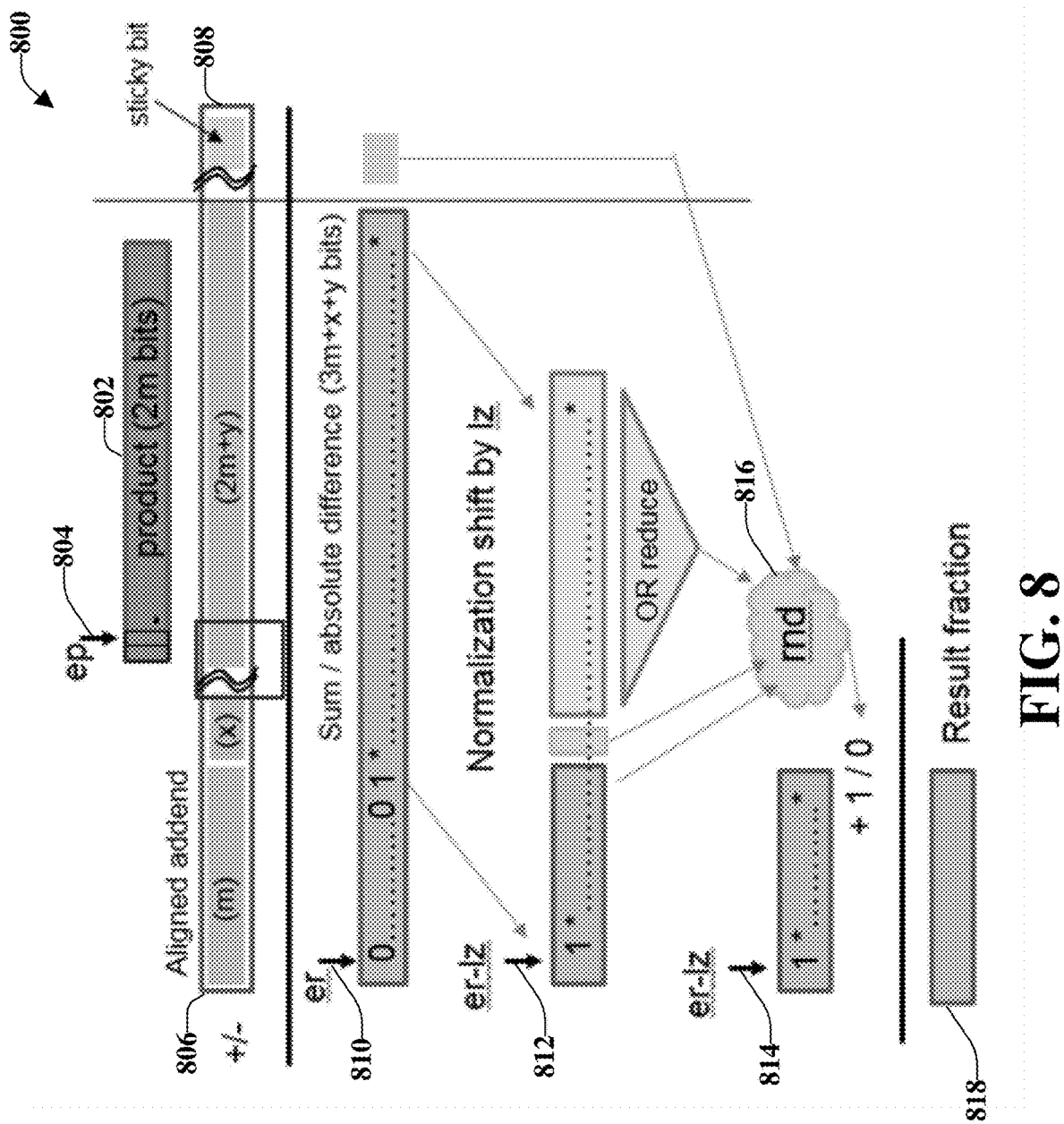
FIG. 8 illustrates an example, non-limiting, schematic representation of an execution performed by a fused multiply-add engine unit in accordance with one or more embodiments described herein.

FIG. 8 illustrates an example, non-limiting, schematic representation of an execution performed by a fused multiply-add engine unit 800 in accordance with one or more embodiments described herein.

In the fused multiply-add engine unit 800 and at a top line 802, and exponent "EP" can be determined. For example, the EP, which is a leading part of a product as indicated by leading arrow 804, can be computed as ep=ea+ec−bias. During computation of the product EP, an addend can be aligned relative to the product. For example, the addend can extend in front of, behind, or overlap with the product.

To be IEEE compliant, m bits (m) and x bits (x) can be placed in front of the product (e.g., in front of the product ep), as indicated to the left of the leading arrow 804, in the second line 806. Further, there can be (2m+y) bits in the middle, and some sticky terms or sticky bits 808 at the end. When the product is larger than 2*m, safety bits can be added between a high part and the product part (x), with another (m) in front.

When the terms are added together, the sum or difference (depending on whether an addition operation or a subtraction operation is performed) can be obtained. An er pointer 810 indicates that, after obtaining the sum or difference, the exponent should be pointing to this position (e.g., the location of the er pointer 810). The equation for the product component can be er=eb−lzb or er=ep+(x+m+1), where x and m are exponents.

For example, to compute the er component, if the addend is larger than the product, it is the exponent of the addend, which is pointing to the top because it sticking out to the left so much that it is sitting at the front. In this case, the er becomes the exponent of the addend. If the addend has leading zeros, it can be shifted out (e.g., eb−lzb shifts out the leading zeros). Alternatively, if that is not the case and the product and addend are in the same range, they can be aligned such that it can be counted from ep (the product) and indicated there are x+M+1 bits between where pointer EP points and the beginning of the number (e.g., ep+(x+M+1), where x+M+1 is a constant).

Additional steps include a first er-leading zero (er-lz) point 812, resulting from a normalization shift by lz, and a second er-lz pointer. For example, the leading zeros can be shifted out. A rounding function 816 can be performed to shorten the value again and a result fraction 818 can be obtained.

In further detail, a multiplier/aligner (e.g., a multiplier/aligner component) can generate aligned addend shift that can be saturated to deliver 3m+x+y bits wide plus sticky bit(s) (e.g., top line 802 and sticky bits 808). Further, the multiplier/aligner can generate a 2m bit wide product. An adder (e.g., an adder component) can result as sign magnitude and can compute sum/absolute difference. Further exponent logic of the adder can generate exponent value er. Further normalization (e.g., implemented via a normalization component) can count a number of leading zeros (lz), normalization the fraction, and adjust exponent: er-lz.

The rounding function 816 (e.g., implemented via a rounding component) can perform a rounding decision, increment fraction as needed, and/or change range and special results.

It is noted that FIG. 8 illustrates the underlying concept of the mantissa data paths of a state of the art FMA engine computing A*C+B. The floating-point operands have a mantissa width of m bits. The aligned addend without the sticky bit has a total width of 3m+x+y; the values x and y are implementation specific and also depend on the supported rounding modes. For the default rounding mode of the IEEE-754-2008 standard, round to nearest even, x and y need to be at least 2. FIG. 8 also indicates the intermediate exponents ep (of the product), er of the intermediate sum or difference, and exponent en of the normalized intermediate sum.

The equations for the exponents are as follows:

$$ep = ea + ec - \text{bias} \quad \quad \text{-- product}$$

$$er = \begin{cases} eb - lzb & \text{when addend} \gg \text{product} \\ ep + (x + m + 1) & \text{else} \end{cases}$$

$$= \begin{cases} eb - lzb & \text{when addend} \gg \text{product} \\ ea + ec - const & \text{else} \end{cases}$$

For a multiply operation and a multiply and scale operation the operand B used in the FMA calculation is forced to zero. For multiply and scale, the FMA engine also has an input integer IM and can select signal scale which when one indicates that the scaling should be applied. The only change to the exponent logic is modifying the equation for ep as follows:

$$ep = ea + ec - \text{bias} + (IM * \text{scale})$$

Figure 9:
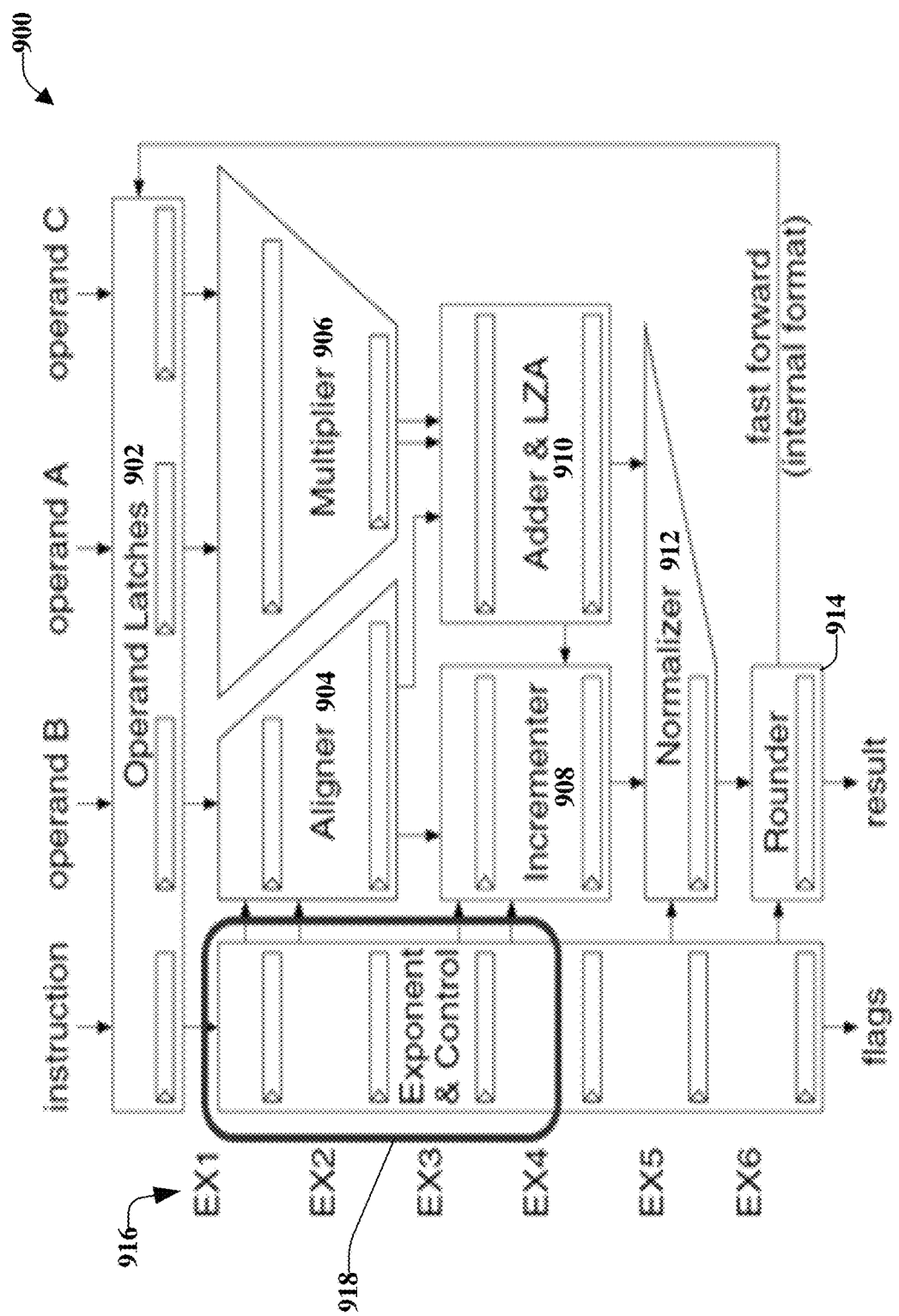
FIG. 9 illustrates example, non-limiting, components of the fused multiply-add engine unit of FIG. 8 in accordance with one or more embodiments described herein.

FIG. 9 illustrates example, non-limiting, components of the fused multiply-add engine unit 800 of FIG. 8 in accordance with one or more embodiments described herein. An FMA unit is also capable of executing a regular multiply instruction, e.g., by forcing the addend to zero, P=A*B=A*B+0. Supporting also a multiply and scale operation requires small change to the design. In some cases, the mantissa handling remains unchanged; only the early stages of the exponent logic are impacted. The figure shows the data flow of the Power7 FPU (ARITH-20), and indicates which part of the design will be impacted.

Inputs to operand latches 902 can include instructions, operand B, operand A, and operand C. Included in the fused multiply-add engine unit 800 can include an aligner 904, a multiplier 906, an incrementer 908, and adder and leading zero analyzer (LZA) 910, a normalizer 912, and a rounder 914.

Illustrated to the left of FIG. 9 is an exponent path 916 comprising one or more exponents (a first exponent EX1, a second exponent EX2, a third exponent EX3, a fourth exponent EX4, a fifth exponent EX5, a sixth exponent EX6, and so on). The first stages of the exponent path 916 can be utilized to compute the ep and the er as discussed above. The later stages of the exponent path 916 can be utilized to compute the er, the lzb, and corrections. Therefore, only the upper portion of the exponent path 916 can be changed in accordance with the disclosed aspects. For example, circled portion 918 indicates the first four exponents are changed as discussed herein. However, in some implementations, less than four exponents are needed to implement the disclosed aspects.

Figure 10:
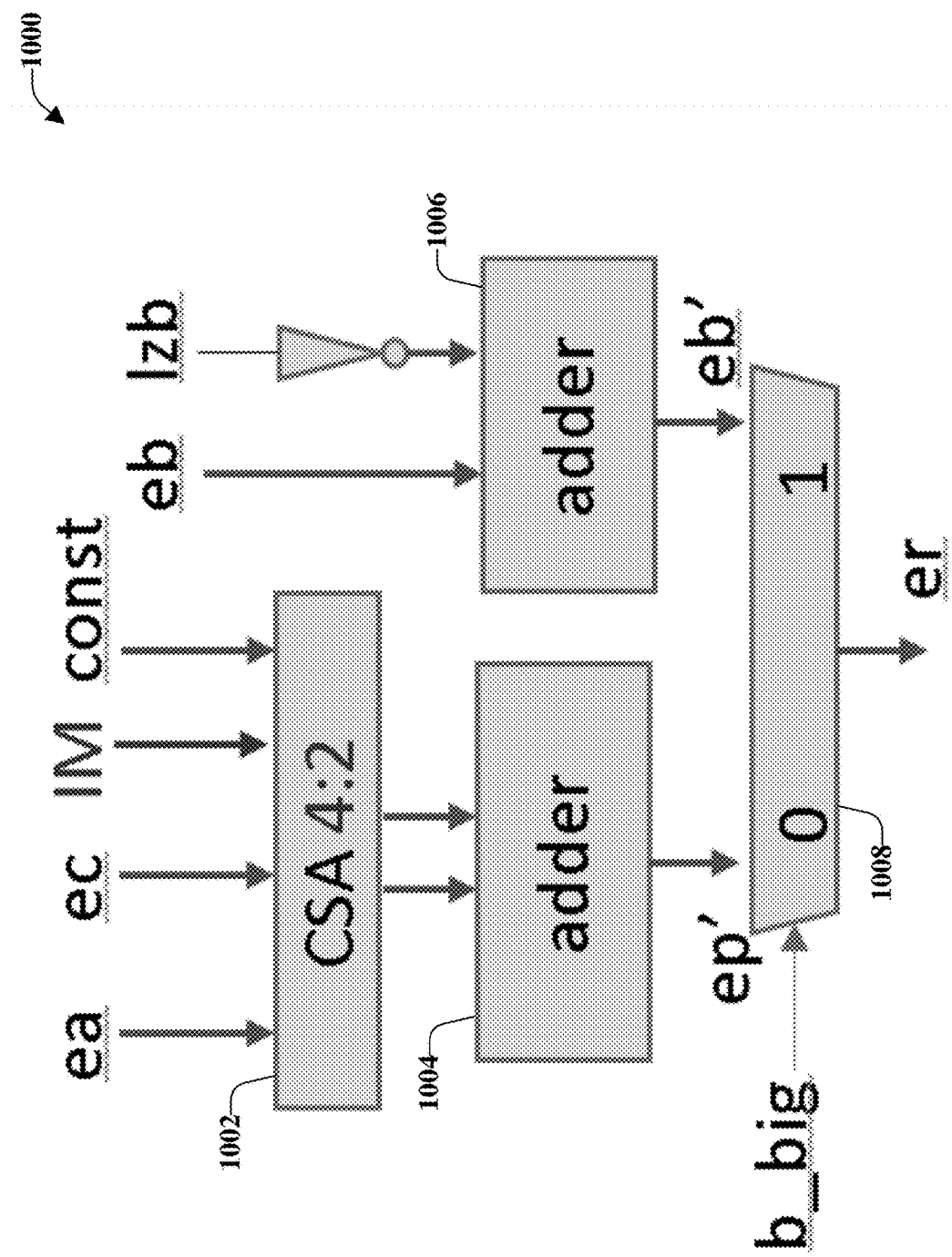
FIG. 10 illustrates an example, non-limiting, fused multiply-add device with support for multiply and scale in accordance with one or more embodiments described herein.

FIG. 10 illustrates an example, non-limiting, fused multiply-add device 1000 with support for multiply and scale in accordance with one or more embodiments described herein. The fused multiply-add device 1000 can be utilized to determine er based on alternative equations represented as:

$$er=eb-lzb \text{ when addend}>>\text{product}$$

$$ea+ec-\text{const}+IM \text{ else}$$

Inputs to a carry save adder block 1002 can include ea, ec, IM, and a constant. Outputs of the carry save adder block 1002 can be provided to a first adder 1004. Further, inputs to a second adder 1006 can include eb and lzb. An output of the first adder 1004 can be ep' and an output of the second adder 1006 can be eb', which can be input to 1008, resulting in the value of er. It is noted that the disclosed aspects can be implemented with low overhead since this is not a critical path in an FPU.

As discussed herein, provided herein are apparatuses, devices, systems, methods, and other embodiments that can perform binary floating-point multiply and scale operations for compute-intensive numerical applications. According to an example, provided is a computer program product for facilitating processing within a computing environment. The computer program product can comprise a computer readable storage medium readable by a processing circuit and storing instructions for execution by the processing circuit for performing a method. The method can comprise obtaining an instruction to be executed, the instruction to perform a multiply and scale operation of a first and a second floating-point operand value and a third integer operand value. The method can also comprise executing the instruction. Execution of the instruction can include multiplying the first floating-point operand value with the second floating-point operand value and obtaining an exact floating-point product. Execution of the instruction can also comprise determining the scaling value based on a control signal of the instruction; the scaling value is either a 1.0 or two to the power of the third operand value. Further, execution of the instruction can comprise multiplying the exact floating-point product by the scaling value and obtaining an exact scaled product, rounding the scaled product into a target floating-point format, and detecting floating-point corner cases and adjusting the exact scaled product according the floating-point corner cases. It is noted that the floating-point cases could include overflow (number is bigger than the largest possible number that can be represented) underflow (the number is smaller than the smallest possible number that can be represented) and NaN (Not a Number).

For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Figure 11:
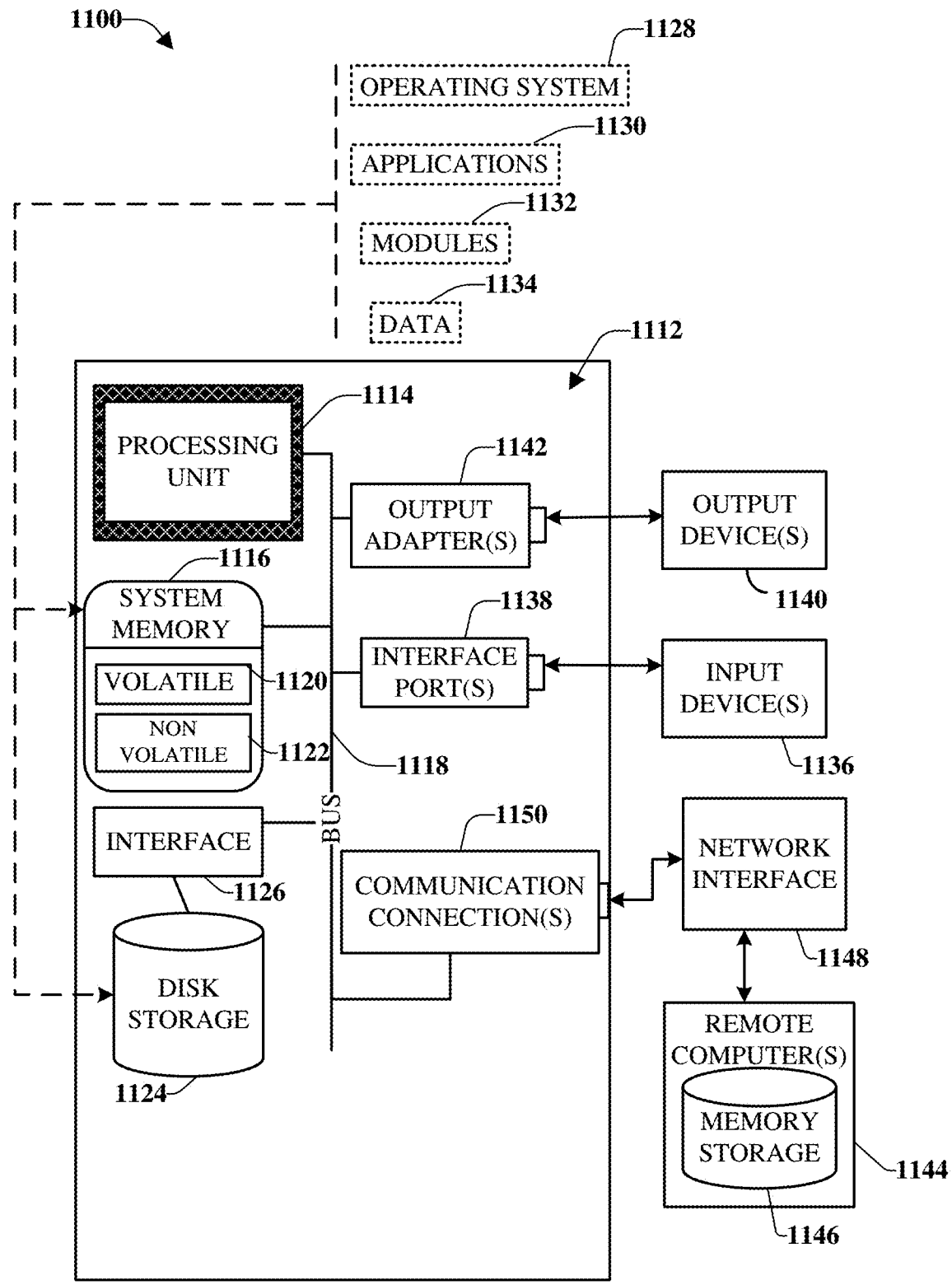
FIG. 11 illustrates a block diagram of an example, non-limiting operating environment in which one or more embodiments described herein can be facilitated.

In order to provide a context for the various aspects of the disclosed subject matter, FIG. 11 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity. With reference to FIG. 11, a suitable operating environment 1100 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), Video Electronics Standards Association (VESA)Local Bus (VLB), Peripheral Component Interconnect (PCI), Card Bus, Universal Serial Bus (USB), Advanced Graphics Port (AGP), Firewire (IEEE 1194), and Small Computer Systems Interface (SCSI). The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include Read Only Memory (ROM), Programmable ROM (PROM), Electrically Programmable ROM (EPROM), Electrically Erasable Programmable ROM (EEPROM), flash memory, or nonvolatile Random Access Memory (RAM) (e.g., Ferroelectric RAM (FeRAM)). Volatile memory 1120 can also include RAM, which acts as external cache memory. By way of illustration and not limitation, RAM is available in many forms such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), Direct Rambus RAM (DRRAM), direct Rambus dynamic RAM (DRDRAM), and Rambus dynamic RAM.

Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1100. Such software can also include, for example, an operating system 1128. Operating system 1128, which can be stored on disk storage 1124, acts to control and allocate resources of the computer 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device (s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device (s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a method of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

The present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include ROM, PROM, EPROM, EEPROM, flash memory, or nonvolatile RAM (e.g., FeRAM. Volatile memory can include RAM, which can act as external cache memory, for example. Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
obtaining, by a system operatively coupled to a processor, a result of a compute-intensive numerical application based on implementation of a single instruction for a binary floating-point multiply and scale operation, wherein the result comprises a floating-point product, and wherein the obtaining the result is based on a multiplication of a first floating-point operand value with a second floating point operand value and two to the power of an integer operand value, wherein the multiplication is performed as the single instruction.

2. The computer-implemented method of claim 1, wherein the obtaining the floating-point product is in response to an instruction to perform the multiply and scale operation of the first floating-point operand value, the second floating point operand value, and the integer operand value.

3. The computer-implemented method of claim 2, wherein the integer operand value is based on a source register address or an immediate field of the instruction, and wherein the integer operand value defines a scaling value that comprises a value of 1.0 or a value represented by two to the power of the integer operand value.

4. The computer-implemented method of claim 1, wherein the obtaining comprises:
obtaining, by the system, an intermediate scaled product; and
rounding, by the system, the intermediate scaled product to a floating-point format based on a defined rounding and corner case handling procedure.

5. The computer-implemented method of claim 1, further comprising:
computing, by the system, a resulting exponent based on inclusion of an immediate value in a product exponent term.

6. The computer-implemented method of claim 1, wherein the obtaining the result comprises obtaining the result based on an equation $eq'=ea+eb+i-lza-lzb-bias$, where ea is an exponent of input A, eb is an exponent of input B, lza is a number of leading zeros in a mantissa of A, lzb is the number of leading zeros in the mantissa of b, and i is an integer.

7. The computer-implemented method of claim 1, wherein the obtaining the floating-point product comprises mitigating an amount of processing overhead.

8. A system, comprising:
a memory that stores computer executable components; and
a processor that executes the computer executable components stored in the memory, wherein the computer executable components comprise:
a multiplication component that obtains a result comprising a floating-point product based on a multiplication of a first floating-point operand value with a second floating point operand value and two to the power of an integer operand value, wherein the multiplication is performed as a single instruction; and
a receiver component that receives an instruction to perform a multiply and scale operation of the first floating-point operand value, the second floating-point operand value, and the integer operand value, wherein the multiplication component obtains the floating-point product in response to the instruction to perform the multiply and scale operation.

9. The system of claim 8, wherein the integer operand value is based on a source register address or an immediate field of the instruction.

10. The system of claim 9, wherein the integer operand value defines a scaling value that comprises a value of 1.0 or a value represented by two to the power of the integer operand value.

11. The system of claim 8, wherein the computer executable components further comprise:
a rounding component that rounds an intermediate scaled product to a floating-point format based on a defined rounding and corner case handling procedure.

12. The system of claim 8, wherein the computer executable components further comprise:
a fused-multiply add unit that determines the result based on selection of an equation from a set of two equations, wherein the selection of the equation is based on a comparison between an addend and a product.

13. The system of claim 8, wherein the computer executable components further comprise a multiply engine and a divide engine, wherein the divide engine is separate from the multiply engine.

14. A computer program product that facilitates binary floating point multiply and scale operation processing within a computing environment, the computer program product comprising a computer readable storage medium having program instructions embodied therewith, the program instructions are executable by a processor to cause the processor to:
obtain a result comprising a floating-point product based on a multiplication of a first floating-point operand value with a second floating point operand value and two to the power of an integer operand value, wherein the multiplication is performed as a single instruction, wherein the obtaining the floating-point product is in response to an instruction to perform a multiply and scale operation of the first-floating point operand value, the second floating-point operand value, and the integer operand value.

15. The computer program product of claim 14, wherein the integer operand value is based on a source register address or an immediate field of the instruction.

16. The computer program product of claim 15, wherein the integer operand value defines a scaling value that comprises a value of 1.0 or a value represented by two to the power of the integer operand value.

17. The computer program product of claim 14, wherein the program instructions cause the processor to compute a resulting exponent based on inclusion of an immediate value in a product exponent term.

* * * * *